US006189934B1

(12) United States Patent
Scruggs

(10) Patent No.: US 6,189,934 B1
(45) Date of Patent: Feb. 20, 2001

(54) ANTI-COPY LAYER UTILIZING SPECTRAL FRAGMENTS

(76) Inventor: Larry W. Scruggs, 1321 W. Waters Ave. #104, Tampa, FL (US) 33604

( * ) Notice: Under 35 U.S.C. 154(b), the term of this patent shall be extended for 0 days.

(21) Appl. No.: 09/307,934

(22) Filed: May 10, 1999

(51) Int. Cl.[7] ............................ B42D 15/00; G03H 1/24; B32B 3/00

(52) U.S. Cl. ................................ 283/67; 283/91; 283/93; 283/902; 428/913; 428/915; 428/916

(58) Field of Search ............................... 283/91, 67, 902, 283/93; 428/913, 915, 916

(56) References Cited

U.S. PATENT DOCUMENTS

| | | | |
|---|---|---|---|
| 4,066,280 | 1/1978 | LaCapria | 283/902 |
| 4,786,084 | 11/1988 | Karney et al. | 283/902 |
| 5,145,212 * | 9/1992 | Mallik | 283/91 |
| 5,169,707 * | 12/1992 | Faykish et al. | 428/913 |
| 5,728,449 | 3/1998 | Steininger et al. | 283/902 |

* cited by examiner

*Primary Examiner*—Andrea L. Pitts
*Assistant Examiner*—Mark T. Henderson

(57) ABSTRACT

An anti-copy layer or film for documents that is substantially transparent to the legitimate user, comprising a multiplicity of small fragments of spectral material embedded within an optically clear coating, wherein multi-angular illumination of the fragments by a copy apparatus generates sufficient amounts of visual noise in a copy as to prevent true-copy replication of the documents.

3 Claims, 1 Drawing Sheet

ANTI-COPY LAYER UTILIZING SPECTRAL FRAGMENTS

CROSS-REFERENCE TO RELATED APPLICATIONS

Not applicable.

BACKGROUND

1. Field of Invention

This invention relates to anti-copy films, layers, and coatings for documents.

BACKGROUND

2. Description of Prior Art

Various entities routinely produce documents which are in need of protection from unauthorized reproduction. The current capabilities of copiers and scanners are such that documents, i.e., photographs, texts, drawings, musical scores, etc., are vulnerable to the unauthorized production of essentially true copies.

There is an unmet need for a means of preventing true-copy reproductions of documents that is effective, economical, and simple to implement while being substantially transparent during legitimate usage of said documents.

Widely available copiers and scanners are capable of reproducing original documents with true copies, in that the copies convey to a user substantially the same value and utility as the originals.

The ability to create true-copy reproductions is often used to replicate documents without authorization from the copyright owner, circumventing the legal and financial requirements of obtaining an authorized copy. Therefore, a need exists for a method by which copies made from a protected document are not true-copies, in that the copies are reduced in perceived value, quality, information content, or utility as compared to the original document.

In order to prevent the production of true copies, it is not necessary to prevent the act of copying itself. Previous examples of anti-copy layers have relied upon various means of obscuring all or part of the underlying information, thereby preventing a true copy. Holographic films as described in U.S. Pat. No. 4,786,084 to Karney et al (1988), opaque aluminum flakes as described in U.S. Pat. No. 4,066,280 to LaCapria (1978), and rectilinear-lined plastic screens as described in U.S. Pat. No. 5,728,449 to Steininger et al (1998), can achieve success in preventing true-copying of treated documents. However, the expense of implementation and the viewing restrictions imposed by these methods are problematic for practical usage.

The need for an economical, effective, and practical means of protecting documents from true-copying, which is also substantially transparent during legitimate use of said documents, has not yet been met, because;

(a) The costs of production and implementation are too high.

(b) The means of application are too complex or restrictive for widespread, practical use.

(c) Photographs and certain other documents require a high level of image quality to be of value to the legitimate user. Prior methods of providing protection from true-copying unacceptably degrade the image quality of a treated document.

SUMMARY

In accordance with the present invention, an anti-copy layer comprises spectral fragments embedded within a coating, for application onto documents in order to impede true-copy reproduction of the documents.

OBJECTS AND ADVANTAGES

It is the object of the present invention to provide a method of protection for documents from true-copy replication that is effective, economical and substantially transparent to the legitimate user of the documents.

The present invention is a method of taking advantage of the spectral properties of materials that transmit, reflect, and refract light. By suspending or affixing within an appropriate vehicle a multiplicity of small fragments of spectral material above or on the face of a document, it is possible to create a layer protecting the document from true-copy replication by copy apparatus utilizing multi-angular light sources.

One material with such spectral characteristics is diamond. Each planar surface or facet of a diamond fragment transmits, reflects, or refracts light, depending upon the angle of incidence. When a diamond fragment is illuminated from multiple angles the totality of internal and external reflections and refractions from the facets obscures any light passing through the fragment, thereby masking underlying information.

The applicant has found it possible to create an effective and practical anti-copy layer for documents utilizing diamond fragments or dust, and photographic quality lacquer. The fragments are dusted upon the surface of a document in a predetermined amount and manner, and the document is then lacquered in the usual fashion. Properly done, the resulting matrix of fragments and lacquer is substantially transparent and does not unacceptably degrade the visual quality of the document. However, when the treated document is illuminated from multiple angles by a copy apparatus, the spectral characteristics of the fragments obscure underlying areas, hindering replication.

True-copy replication is prevented because the anti-copy layer presents to the copying device a sufficient level of visual static or noise as to render a copy substantially inferior in value or utility when compared to the original. However, the same spectral characteristics of the fragments allow the legitimate user of a treated document substantially the same value as an untreated document, because legitimate usage of the document generally occurs under diffuse lighting conditions than the multi-angular lighting generated by the copying device.

There are other crystalline materials, natural and synthetic, with spectral characteristics similar to those of diamond, such as, but not limited to, cubic zirconia, sapphire, quartz, and yttrium aluminum garnet, which can substitute for diamond. Also, fragment-bearing vehicles other than lacquer, such as, but not limited to, polyesters, laminates and adhesives, and clay-based coatings can be utilized in creating an anti-copy layer.

Accordingly, this invention consists of situating spectral fragments within an appropriate vehicle, upon a document, for true-copy prevention. The wide range of possible variations of spectral fragments and vehicles, applied during document production or subsequent thereto, are claimed by this invention.

Accordingly, several objects and advantages of the present invention are:

(a) to provide a means of anti-copy protection to documents that is substantially transparent during legitimate usage of said documents;

(b) to provide a means of anti-copy protection that is simple and inexpensive to produce;

(c) to provide a means of anti-copy protection that is adaptable to a wide range of coating and laminating methodologies and formulations;

(d) to provide a means of anti-copy protection suitable for photographs and other continuous tone documents;

(e) to provide a means of anti-copy protection suitable for texts, drawings, musical scores, currencies and other graphic documents; and (f) to provide a means of anti-copy protection that can be utilized during production of the documents, or at some point afterwards.

Further objects and advantages are to provide a means of anti-copy protection that is simple and inexpensive to produce and apply to documents, which can be implemented by manufacturers or individual users, which is substantially transparent during legitimate use of the documents, and which prevents true-copy reproduction of the documents. Still further objects and advantages will become apparent from a consideration of the ensuing description and drawings.

DRAWING FIGURES

FIGS. 1*a* and 1*b* are cross sections of anti-copy layers, comprising spectral fragments embedded within transparent coatings, upon the surface of documents.

REFERENCE NUMERALS IN DRAWINGS

| | |
|---|---|
| 10 | spectral fragments |
| 20 | transparent coating |
| 30 | document |
| 40 | adhesive of laminate |
| 50 | laminate |

DESCRIPTION

Figure 1A:
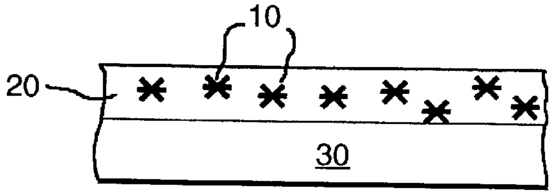
Figure 1B:
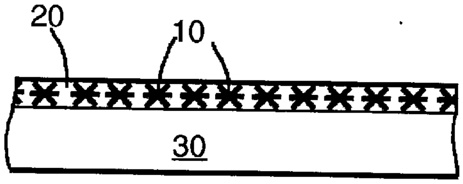

FIGS. 1*a* & 1*b*—Preferred Embodiment

A preferred embodiment of the means of anti-copy protection of the present invention is illustrated in FIGS. 1*a* & 1*b*. The invention consists of fragments 10 of a predetermined size embedded within a coating 20 of a predetermined consistency, which is affixed to the face of a document 30. In the preferred embodiment, the fragments 10 are diamond powder in the 20–30 micron range, and the coating 20 is a photographic quality lacquer. However, the fragments are not necessarily limited to this size range, and may consist of other materials with similar spectral properties, such as, but not limited to, cubic zirconia, white sapphire, quartz, yttrium aluminum garnet, spinel, etc., either natural or synthetic in origin; and the coating can consist of any other formulation with similar optical, protective and adhesive properties, such as, but not limited to, polyesters, acrylics, or clay-based coatings, etc.

The fragments 10 are dusted onto the face of the document 30. The coating 20 is then applied to the document 30 resulting in a layer comprising spectral fragments 10 embedded within a transparent coating 20, and situated above the face of the document 30.

In FIG. 1*a* the fragments 10 are encapsulated within the coating 20, and in FIG. 1*b* the fragments 10 are substantially the same thickness as the coating 20.

Figure 2:
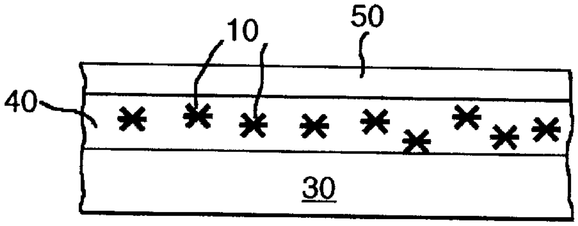
FIG. 2 is a cross section of an anti-copy layer, comprising spectral fragments embedded within the adhesive of a laminate, upon the surface of a document.
Figure 3:
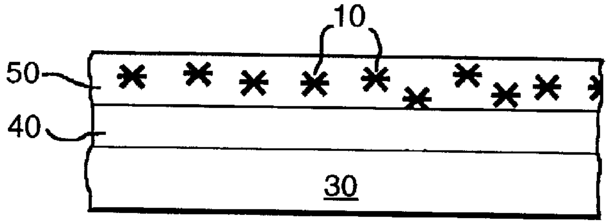
FIG. 3 is a cross section of an anti-copy layer, comprising spectral fragments embedded within a laminate, upon the surface of a document.

FIGS. 2–3—Additional Embodiments

Additional embodiments are shown in FIGS. 2 & 3. In FIG. 2, the fragments 10 are embedded within the adhesive layer 40 of a laminate 50, which is affixed to the face of the document 30, resulting in the fragments being situated above the face of the document 30. In FIG. 3, the fragments are incorporated within the body of the laminate 50, resulting in the fragments being situated above the face of the document.

Advantages

From the description above, a number of advantages of my anti-copy method become evident:

(a) Spectral fragments of many variations are easily situated above or affixed to the faces of documents.

(b) Various configurations of coatings, films, laminates, utilizing a variety of application methods, can be used as vehicles for the fragments.

(c) The method of protection is adaptable to various manufacturing processes, and can easily be configured for individual usage, such as a spray can of lacquer with the fragments included.

(d) The method of protection has a substantial number of combinations of fragments and vehicles so as to provide appropriate protection for a variety of documents.

(e) The invention can be of benefit to any entity with a document to protect from true copy replication.

Operation FIGS. 1–3

The operation of the anti-copy invention is to treat a document with spectral fragments in such a way as to affix and situate said fragments within a layer on or above the face of said document in a predetermined fashion. Thereafter, whenever the document is used in a copy apparatus, the anti-copy layer, due to the spectral characteristics of the fragments, does reflect and refract the light being generated by the copying device in such a manner as to create visual noise patterns and other undesirable artifacts in the copy, thus preventing the creation of a true copy of the treated document.

Conclusion, Ramifications, and Scope

Accordingly, the reader will see that the anti-copy method of this invention can be used to prevent true-copy reproductions of documents, benefitting entities desiring to protect their interests when publishing, printing or distributing the documents. Furthermore, the anti-copy layer has additional advantages in that it is can be adapted to and incorporated with existing coating and laminating procedures;

it is adaptable with current printing technologies, both traditional and digital;

it can be applied during manufacture of documents or at some point in time thereafter;

it allows for the usage of a variety of spectral fragments, both natural and synthetic in origin;

Although the description above contains specifications, these should not be construed as limiting the scope of the invention but as merely providing illustrations of some of the presently preferred embodiments of the present invention. For example, instead of fragments, entire crystals of spectral material can be used as long as said crystals are small enough in size for practical use.

Thus the scope of the invention should be determined by the appended claims and their legal equivalents, rather than by the examples given.

SEQUENCE LISTING

Not applicable.

I claim:

1. An anti-copy layer for documents which, while essentially transparent under diffuse light conditions, prevents production of true-copies by light dependent copying apparatus, comprising;

a multiplicity of small fragments of a crystalline material of a predetermined size, with spectral characteristics, embedded within a substantially transparent coating, wherein said fragments have spectral characteristics of transmitting, reflecting, and refracting light striking said fragments, according to angle of incidence, wherein multi-angular illumination of a spectral fragment visually results in more reflection and refraction of light than in transmission, thereby visually obscuring underlying information, wherein said coating is comprised of, but not limited to, lacquer, water-based polymers, polyester resins, wherein a multiplicity of fragments situated within said coating upon a document, when illuminated in a copying apparatus, generate a sufficient amount of visual noise and undesirable artifacts in copies as to render said copies inferior in quality, value, or utility compared to said document, wherein said coating and spectral fragments can be formulated and adapted for application utilizing traditional and digital printing and coating methodologies, including packaging in spray cans for usage by individuals.

2. The anti-copy layer of claim 1 wherein said coating is applied in a random manner to a document.

3. The anti-copy layer of claim 1 wherein said coating is applied in a predetermined manner, providing protection only to selected areas of a document.

* * * * *